US010606822B2

(12) United States Patent
Ganjihal et al.

(10) Patent No.: US 10,606,822 B2
(45) Date of Patent: Mar. 31, 2020

(54) DYNAMICALLY UPDATING METADATA (71) Applicant: HEWLETT PACKARD ENTERPRISE DEVELOPMENT LP, Houston, TX (US)

(72) Inventors: Anand A Ganjihal, Bangalore (IN); Santigopal Mondal, Bangalore (IN); Anoop Kumar Raveendran, Bangalore (IN); Sandya Srivilliputtur Mannarswamy, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 334 days.

(21) Appl. No.: 15/521,986

(22) PCT Filed: Jan. 15, 2015

(86) PCT No.: PCT/US2015/011586
§ 371 (c)(1),
(2) Date: Apr. 26, 2017

(87) PCT Pub. No.: WO2016/069036
PCT Pub. Date: May 6, 2016

(65) Prior Publication Data
US 2017/0322967 A1 Nov. 9, 2017

(30) Foreign Application Priority Data
Nov. 1, 2014 (IN) .......................... 5483/CHE/2014

(51) Int. Cl.
*G06F 16/22* (2019.01)
*G06F 16/23* (2019.01)
*G06F 16/11* (2019.01)

(52) U.S. Cl.
CPC .......... *G06F 16/235* (2019.01); *G06F 16/113* (2019.01); *G06F 16/2228* (2019.01); *G06F 16/2272* (2019.01)

(58) Field of Classification Search
CPC .................................................. G06F 16/2272
See application file for complete search history.

(56) References Cited

U.S. PATENT DOCUMENTS 5,333,315 A 7/1994 Saether et al.
6,067,541 A 5/2000 Raju et al.
(Continued)

OTHER PUBLICATIONS

International Preliminary Report on Patentability received for PCT Patent Application No. PCT/US2015/011586, dated May 11, 2017, 7 pages.

(Continued)

*Primary Examiner* — Kris E Mackes
(74) *Attorney, Agent, or Firm* — Hewlett Packard Enterprise Patent Department (57) ABSTRACT

Dynamic updating of metadata associated with a file system is described herein. In accordance with an example, the updating includes creating a shadow file system metadata (FSM) index map in a shadow data block. The shadow data block is associated with a metadata storage of the file system and the metadata storage stores metadata files associated with the file system. The shadow FSM index map is associated with the metadata storage through an index map of the metadata storage, the index map being indicative of the metadata files in the metadata storage. The shadow FSM index map is updated to dynamically update the metadata associated with the file system, in the metadata storage.

15 Claims, 6 Drawing Sheets

(56) References Cited

U.S. PATENT DOCUMENTS

| | | | |
|---|---|---|---|
| 7,783,611 B1 * | 8/2010 | Hamilton | G06F 16/1865 |
| | | | 707/690 |
| 8,131,674 B2 | 3/2012 | Arrouye et al. | |
| 2005/0010589 A1 | 1/2005 | Novak et al. | |
| 2006/0041606 A1 | 2/2006 | Sawdon | |
| 2008/0028169 A1 | 1/2008 | Kaplan et al. | |
| 2008/0034374 A1 | 2/2008 | Davis | |
| 2008/0091655 A1 | 4/2008 | Gokhale et al. | |
| 2009/0216789 A1 | 8/2009 | Chowdhary et al. | |
| 2010/0042599 A1 | 2/2010 | Jacopi et al. | |
| 2010/0277611 A1 | 11/2010 | Holt et al. | |
| 2011/0258198 A1 * | 10/2011 | Sun | G06F 16/337 |
| | | | 707/742 |

OTHER PUBLICATIONS

Awan, M A, "Stackably Extensible Template Layer for File System Development Under Windows NT (Family)." E-Tech 2004. IEEE, 2004., 9 pages, available at http://www.researchgate.net/publication/4102258_Stackably_extensible_template_layer_for_file_system_development_under_Windows_NT_%28Family%29.

Brandt, Scott A., "Efficient Metadata Management in Large Distributed Storage Systems," (Research Paper), Mass Storage Systems and Technologies, 2003, IEEE, 9 pages, available at http://www.crss.ucsc.edu/media/papers/brandt-mss03.pdf.

International Search Report & Written Opinion received in PCT Application No. PCT/US2015/011586, dated Jun. 16, 2015, 12 pages.

* cited by examiner

DYNAMICALLY UPDATING METADATA

BACKGROUND

Files in a file system have metadata files associated with them to hold metadata information thereof. Generally, such metadata files are relevant for operation of the file system and are stored in a manner that they can be located and identified easily. As file systems evolve over time, new features are added into the file system. As a result, the files and associated metadata files are also added to the file system and stored appropriately for ease of identification and access.

BRIEF DESCRIPTION OF FIGURES

The detailed description is provided with reference to the accompanying figures. In the figures, the left-most digit(s) of a reference number identifies the figure in which the reference number first appears. The same numbers are used throughout the figures to reference like features and components.

DETAILED DESCRIPTION

Metadata files of a file system are involved during operations of the file system and, therefore, such metadata files are stored for being readily accessible to the file system. The metadata files are usually allocated a certain volume of memory space, referred to as metadata storage, for storing the metadata files created or acquired during operation of the file system over a period of time at the pre-allocated metadata storage. For example, a portion of the volume can be pre-reserved as the metadata storage, and can be easily located and accessed for operation of the file system.

As the file system evolves with operation over time, new features are added to the file system leading to a proliferation of the metadata files associated with the file system. In such a case, at a certain point, the pre-allocated fixed volume may not be sufficient for the metadata files. In order to support the proliferation of the metadata files, the entire volume of the memory space may have to undergo a modification, such as migration or balancing of data, to create space for accommodating the increased metadata files. However, such modification of the volume may neither ensure support for future use nor be scalable.

Systems and methods for dynamically updating metadata, for instance, associated with a file system, are disclosed herein. The present subject matter provides an approach for adding metadata files in metadata, for instance, in a metadata storage, in a dynamic manner, i.e., volume of the metadata storage for adding the metadata files is not pre-reserved or constrained. According to an aspect of the present subject matter, for accommodating new metadata files in the metadata, an index map of the metadata storage is updated instead of adding the metadata files directly in the metadata storage, the latter involving modification of the entire volume. For instance, the index map of the metadata is updated indirectly through another associated index map. Accordingly, in said example, as and when a metadata file is to be created and added to the metadata, the other index map is modified. The modification of the other index map updates the index map of the metadata to allocate a certain portion of the volume of the metadata storage. This prevents the pre-allocation of pre-reservation of volume for the addition of new metadata files to the file system. In addition, the approach is scalable and can provide for addition of new metadata files in future without any modification in the entire volume holding the metadata files.

In accordance with one example of the present subject matter, a shadow data block corresponding to and associated with the metadata storage of the file system, can be created. As mentioned previously, the metadata storage can store metadata files associated with the file system. For instance, the shadow data block can be an image of the metadata storage and can serve as a container for an index map of unique identifiers of the metadata files of the file system. In order to achieve the addition of metadata files, the shadow data block can be modified. In an example, an index can be added in the shadow data block for adding a metadata file in the metadata storage, the index being an index for a unique identifier of the metadata file.

Accordingly, in an example of the present subject matter, a shadow file system metadata (FSM) index map can be created in the shadow data block. The shadow FSM index map can be linked with the metadata storage through the index map of the metadata storage. For instance, the index map can be an index of and can indicate the metadata files in the metadata storage. Further, in one case, the index map of the metadata storage can include an index map of unique identifiers of the metadata files and index map thereof. The index map of unique identifiers of the metadata files is referred to as a primary file system metadata (FSM) index map. In such a case, for example, the shadow FSM index map can be associated with the metadata storage through a primary FSM index map and an intermediate index map. The intermediate index map can be an index of the primary FSM index map. Accordingly, in such a case, the shadow FSM index map can be a sub-index of the primary FSM index map, i.e., index of the index map of the primary FSM index map.

Further, as part of updating the shadow data block, in an example, the shadow FSM index map can be modified to dynamically update the metadata, i.e., for dynamically adding metadata files to the metadata storage. In an example, an index can be added in the shadow FSM index map for adding a metadata file in the metadata, the index being an index for a unique identifier of the metadata file. For instance, in case the file system is a Unix-based file system, the unique identifier, referred to as a reserved tag, associated with the metadata file, referred to as reserved file, to be added is added to the shadow data block. For example, an index for the reserved tag can be added to the shadow FSM index map. The modification of the shadow FSM index map, in turn, can achieve addition of a block in the index map, associated with the metadata storage. Further, the block added corresponds to a dynamically allocated volume for storing the metadata file to be added.

The present subject matter provides for updating the metadata for addition of the metadata files to the metadata storage in a dynamic manner, i.e., as and when the metadata files are to be added to the file system, without having to reserve a volume for adding the metadata files. In addition, the present subject matter provides for convenient addition of the metadata files without making considerable changes in the volume of the metadata storage. Further, the addition of the metadata files to the metadata, in accordance with the present subject matter, provides for scalability for updating the metadata in the future with the metadata files.

The above systems and methods are further described in the figures and associated description below. It should be noted that the description and figures merely illustrate the principles of the present subject matter. Therefore, various arrangements that embody the principles of the present subject matter, although not explicitly described or shown herein, can be devised from the description and are included within its scope.

Figure 1A:
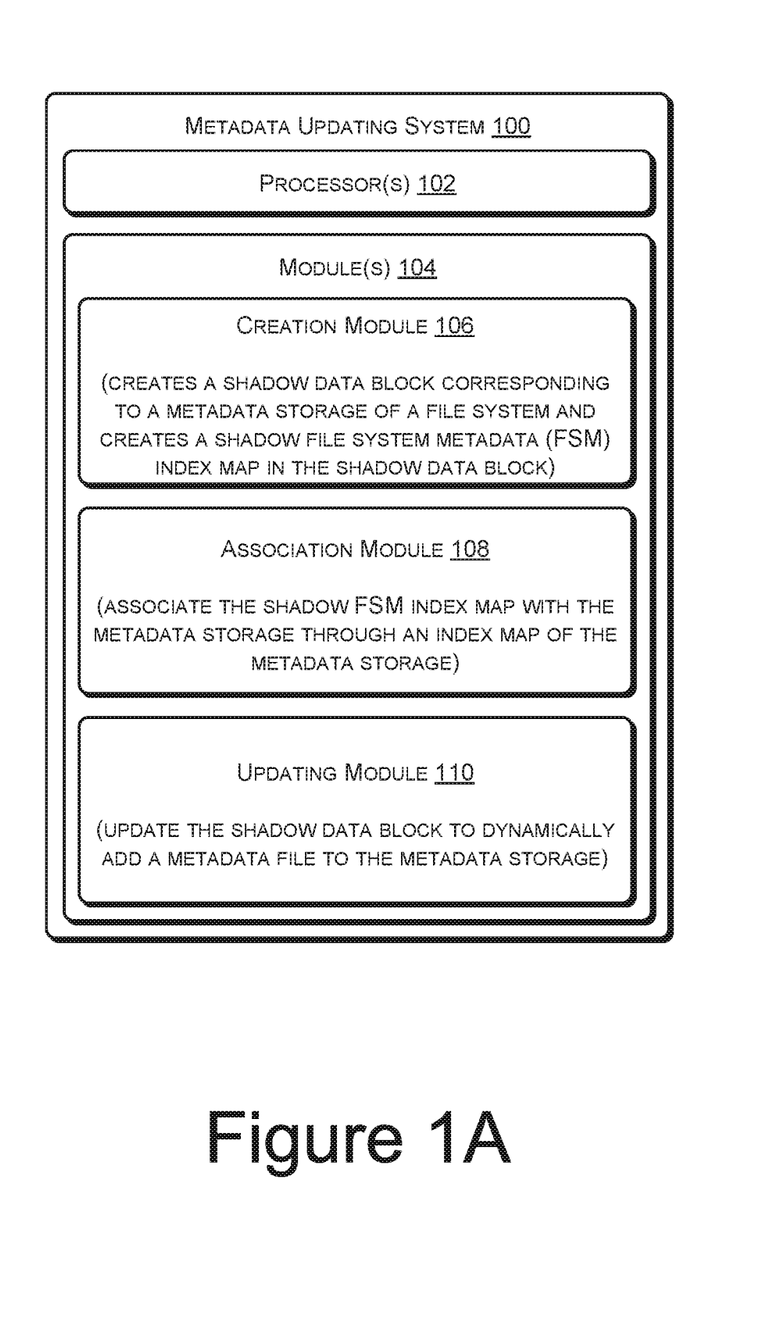
FIG. 1A illustrates a schematic of a metadata updating system for dynamically updating metadata, according to an example of the present subject matter.

FIG. 1A illustrates components of a metadata updating system 100, according to an example of the present subject matter. The metadata updating system 100 may include, for example, a processor 102 and modules 104 communicatively coupled to the processor 102. The processor 102 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labeled as "processor(s)", may be provided through the use of dedicated hardware as well as hardware capable of executing computer-readable instructions.

The modules 104, amongst other things, include routines, programs, objects, components, and data structures, which perform particular tasks or implement particular abstract data types. The modules 104 may also be implemented as, signal processor(s), state machine(s), logic circuitries, and/or any other device or component that manipulates signals based on operational instructions. Further, the modules 104 can be implemented by hardware, by computer-readable instructions executed by a processing unit, or by a combination thereof. The modules 104 can include a creation module 106, an association module 108, and an updating module 110.

The metadata updating system 100 can provide for dynamically updating a metadata for addition of the metadata files to the metadata in a dynamic manner. According to an aspect of the present subject matter, the metadata updating system 100 can update the metadata indirectly by updating an index map of a metadata storage, instead of adding the metadata files directly in the metadata storage. In an example, the metadata updating system 100 associates the index map of the metadata storage with another index map and updates the index map by modifying the other index map. The modification of the other index map by the metadata updating system 100 updates the index map of the metadata storage. In an example, the metadata updating system 100 can achieve update of the index map to allocate a certain portion of the volume of the metadata storage for adding the metadata file, thereby providing for dynamic updating of the metadata.

In an example, during operation of the metadata updating system 100, the creation module 106 creates a shadow data block corresponding to the metadata storage of the file system. For instance, the shadow data block can be an image of the metadata storage and can serve as a container for an index map of unique identifiers of the metadata files of the file system. Further, the creation module 106 creates a shadow file system metadata (FSM) index map in the shadow data block. In an example, the association module 108 can associate the shadow FSM index map with the metadata storage to associate the shadow data block with the metadata storage. According to an aspect of the present subject matter, the association module 108 can couple the shadow FSM index map to the metadata storage through an index map of the metadata storage. For instance, the index map of the metadata storage can be indicative of the metadata files in the metadata storage. For example, the index map of the metadata storage can indicate an actual location of the metadata files in the volume.

Further, the updating module 110 can modify the shadow FSM index map to dynamically update the metadata, i.e., for dynamically adding metadata files to the metadata storage. As the updating module 110 modifies the shadow FSM index map, a block can be added in the index map of the metadata storage. In turn, the added block may correspond to a dynamically allocated volume for storing the metadata file to be added. The various components of the metadata updating system 100 are described in detail in conjunction with FIG. 1B.

Figure 1B:
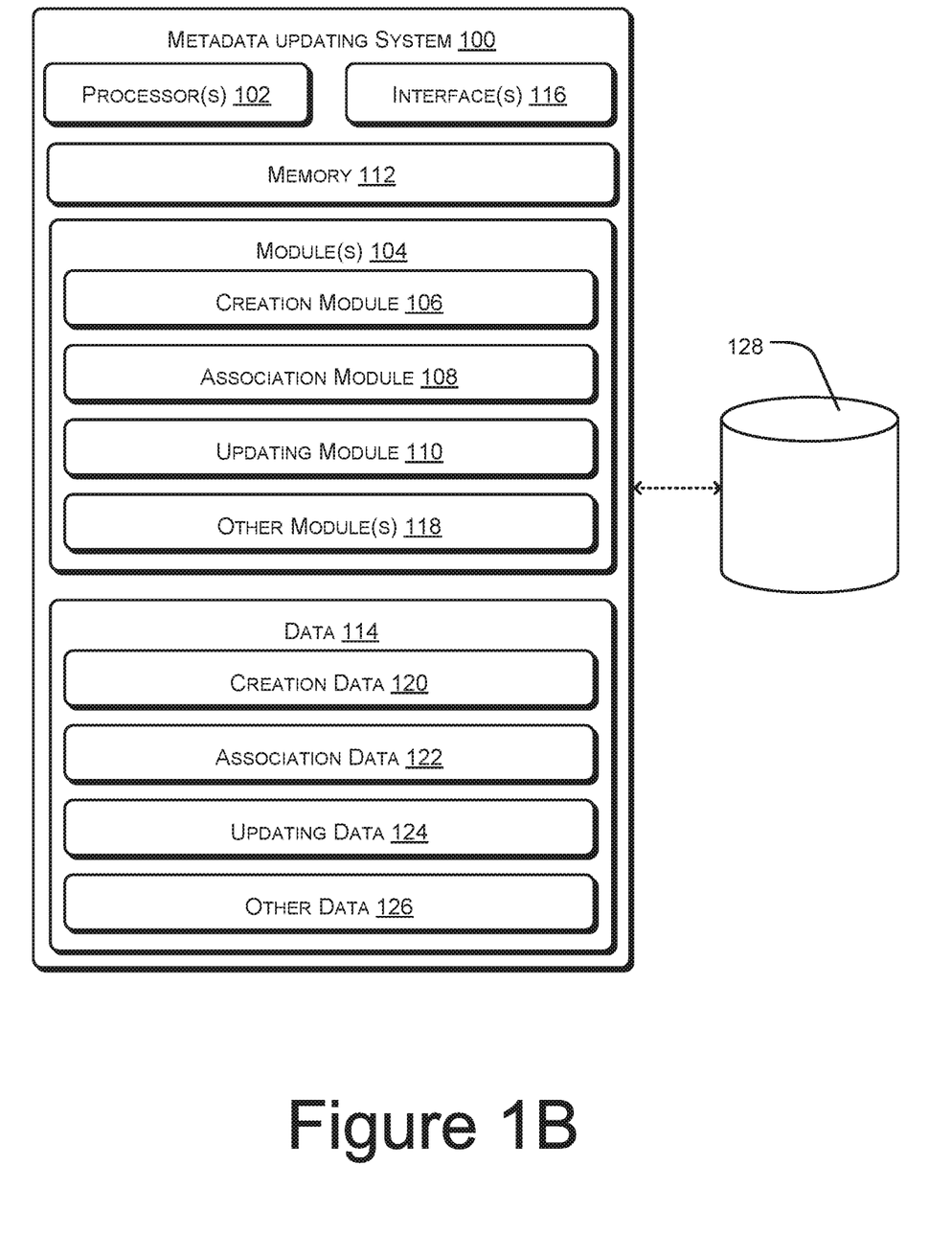
FIG. 1B illustrates a detailed schematic of the metadata updating system for dynamically updating the metadata, according to an example of the present subject matter.

FIG. 1B illustrates a schematic of the metadata updating system 100 showing various components thereof, according to an example of the present subject matter. As shown in FIG. 1B, in an example, the metadata updating system 100 can be a component of a file system and can provide for dynamically adding metadata files to the file system. The metadata updating system 100, among other things, may include the processor 102, modules 104, a memory 112, data 114, and interface(s) 116. The processor 102, among other capabilities, may fetch and execute computer-readable instructions stored in the memory 112. The memory 112, communicatively coupled to the processor 102, can include a non-transitory computer-readable medium including, for example, volatile memory, such as Static Random Access Memory (SRAM) and Dynamic Random Access Memory (DRAM), and/or non-volatile memory, such as Read Only Memory (ROM), erasable programmable ROM, flash memories, hard disks, optical disks, and magnetic tapes.

The interfaces 116 may include a variety of commercially available interfaces, for example, interfaces for peripheral device(s), such as data input output devices, referred to as I/O devices, storage devices, network devices, and intermediate power devices. The interfaces 116 may facilitate multiple communications within a wide variety of networks and protocol types, including wired networks and wireless networks.

As mentioned earlier, the metadata updating system 100 may include the modules 104. In an example, in addition to the creation module 106, the association module 108, and the updating module 110, the modules 104 may include other module(s) 118. The other module(s) 118 may include computer-readable instructions that supplement applications or functions performed by the metadata updating system 100.

Further, the data 114 can include creation data 120, association data 122, updating data 124, and other data 126. The other data 126 may include data generated and saved by the modules 104 for providing various functionalities to the metadata updating system 100.

In addition, the metadata updating system 100 can be coupled to a metadata storage 128. The metadata updating system 100 can dynamically add metadata files to the metadata of the file system in the metadata storage 128.

As explained above, the metadata updating system 100 can achieve dynamic updating of the metadata in the metadata storage 128 associated with the file system to add the metadata files to the file system in a dynamic manner. According to an aspect, the metadata updating system 100 can indirectly update the metadata in the metadata storage 128, instead of adding the metadata files directly in the metadata storage 128. For example, the metadata updating system 100 can update an index map of the metadata storage 128. In an example, the metadata updating system 100 can associate the index map of the metadata storage 128 with the shadow FSM index map and can update the index map by modifying the shadow FSM index map. When the metadata updating system 100 modifies the shadow FSM index map, the index map of the metadata storage 128 is modified in turn, to allocate a certain portion of the volume of the metadata storage 128 for adding the metadata file, thereby providing for dynamic updating of the metadata.

According to an example, the creation module 106 can create the shadow data block to correspond to the metadata storage 128. For example, in case the file system is a Unix-based file system, the shadow data block can be a container provided in a reserved bitfile metadata table (RBMT). In such a case, the shadow data block can be a metadata cell or an mcell on page 0 of each volume in the RBMT. The shadow data block, in an example, can be a storage for the index map associated with the metadata storage 128. Accordingly, in an example, the creation module 106 can create the shadow FSM index map in the shadow data block. In an example, the information associated with the created shadow data block and the shadow FSM index map can be stored in the creation data 120.

Further, the association module 108 can associate the shadow FSM index map to the metadata storage 128, to associate the shadow data block to the metadata storage 128. According to an aspect of the present subject matter, the shadow FSM index map can be linked with the metadata storage 128 through the index map of the metadata storage 128. In an example, the index map can be an index of the metadata files in the metadata storage 128. The information for the association of the shadow FSM index map with the metadata storage 128 and the index map thereof is stored in the association data 122.

According to one example, the index map of the metadata storage 128 to which the shadow FSM index map is coupled can be a cascaded structure of index maps. For instance, the index map can include a primary file system metadata (FSM) index map and an index map of the primary FSM index map, referred to as an intermediate index map. In one case, the primary FSM index map can be an index map of unique identifiers of the metadata files. Therefore, in such a case, the association module 108 can associate the shadow FSM index map to the metadata storage 128 through the primary FSM index map and the intermediate index map of the primary FSM index map. Accordingly, the shadow FSM index map forms an index of the index of the primary FSM index map.

In addition, as explained previously, for achieving the dynamic addition of metadata files in the metadata storage 128, the updating module 110 can update the shadow data block. In an example, an index can be added in the shadow FSM index map stored in the shadow data block for adding a metadata file in the metadata storage 128. For instance, the index added in the shadow FSM index map can correspond to the primary FSM index map, for updating the primary FSM index map, as a result of which, the allocation of a portion of the volume in the metadata storage 128 is achieved for addition of metadata files. The dynamic updating of the metadata by the updating module 110 is explained further in detail with reference to FIG. 1C.

Figure 1C:
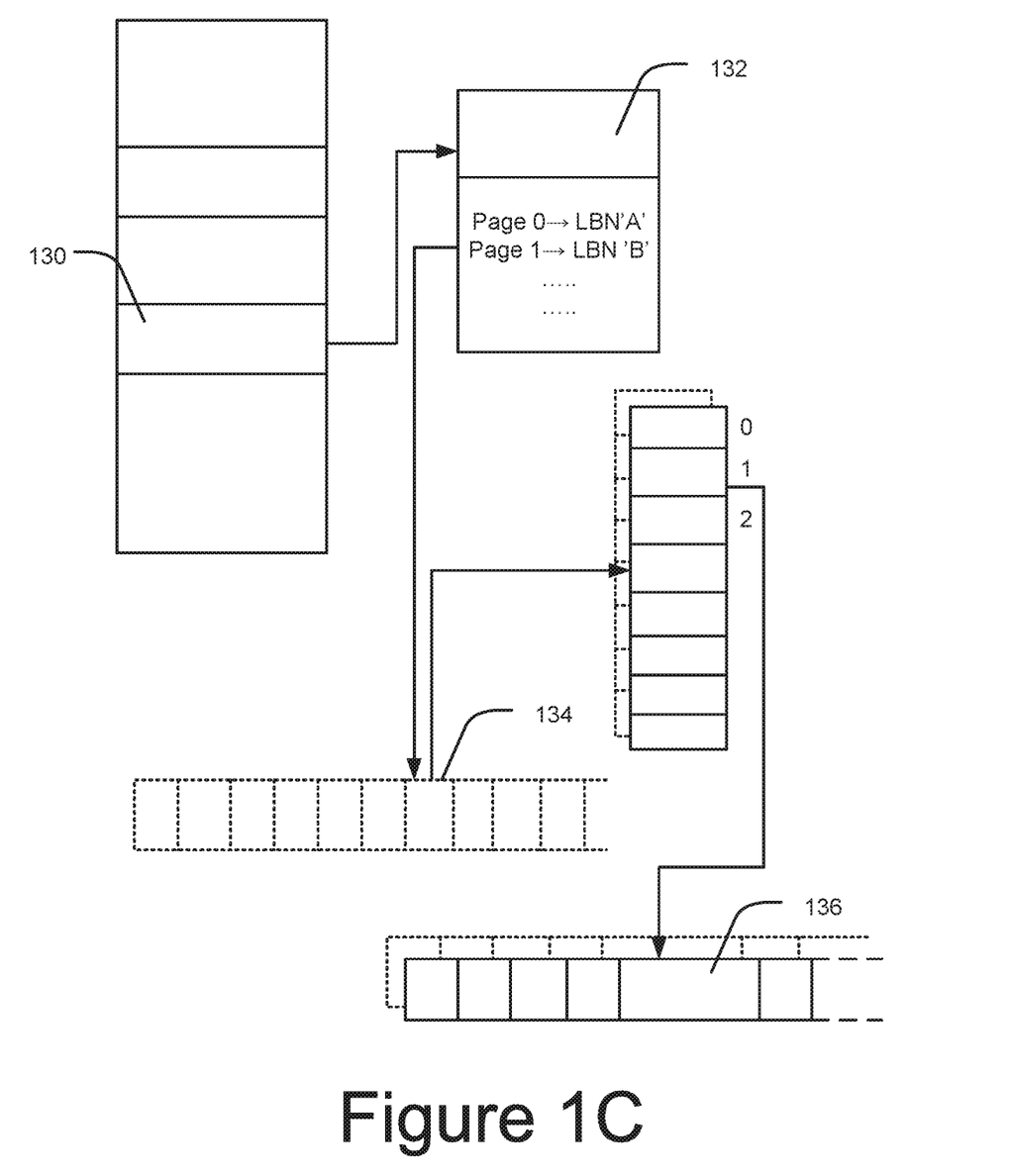
FIG. 1C illustrates association of various index maps and a metadata, according to an example of the present subject matter.

FIG. 1C shows, as an example, relationships between various index maps in the file system, in accordance with the present subject matter. As can be seen from FIG. 1C, the shadow data block 130 holds the shadow FSM index map in an mcell 132. The shadow FSM index map in the mcell 132 is associated with the primary FSM index map in the block 136. The block 136 can be an mcell of the metadata file which is to be added to the file system. The shadow FSM index map in the mcell 132 can be associated with the primary FSM index map through an intermediate index map stored in block 134. In an example, the block 134 can hold sets of intermediate index maps, the intermediate index maps being indices for the primary FSM index maps. In case the file system is a Unix-based file system, the primary FSM index map can be stored in an inode of the file system and can hold information regarding the metadata files, referred to as reserved files, in the metadata storage 128 of the file system.

Further, during operation of the metadata updating system 100 to dynamically update the metadata in the metadata storage 128, the updating module 110 can modify the shadow data block 130. For instance, the updating module 110 can update the shadow FSM index map by adding an index to the shadow FSM index map. The modification of the shadow FSM index map can, in turn, be reflected in the primary FSM index map. In the present case where the shadow FSM index map is linked to the primary FSM index map through the intermediate index map, the modification in the shadow FSM index map is reflected in the intermediate map.

For instance, based on the index added in the shadow FSM index map, an index in the intermediate map is created and the index in the shadow FSM index map directs to the index in the intermediate map. Similarly, on the basis of the index created in the intermediate map, an index can be created and located in the primary FSM index map. Accordingly, the index created in the primary FSM index map can indicate allocation of a portion of the volume in the metadata storage 128 for addition of the new metadata file.

In an example, the file system can be a multi-volume file system, i.e., having various volumes of storage. In such a case, according to the present subject matter, each volume can have a metadata storage 128 having the metadata stored therein. Accordingly, when the metadata is to be updated, the metadata associated with each volume of the multi-volume file system is updated. For instance, the above mentioned scheme of updating the metadata is employed for each volume of the multi-volume file system.

Figure 2:
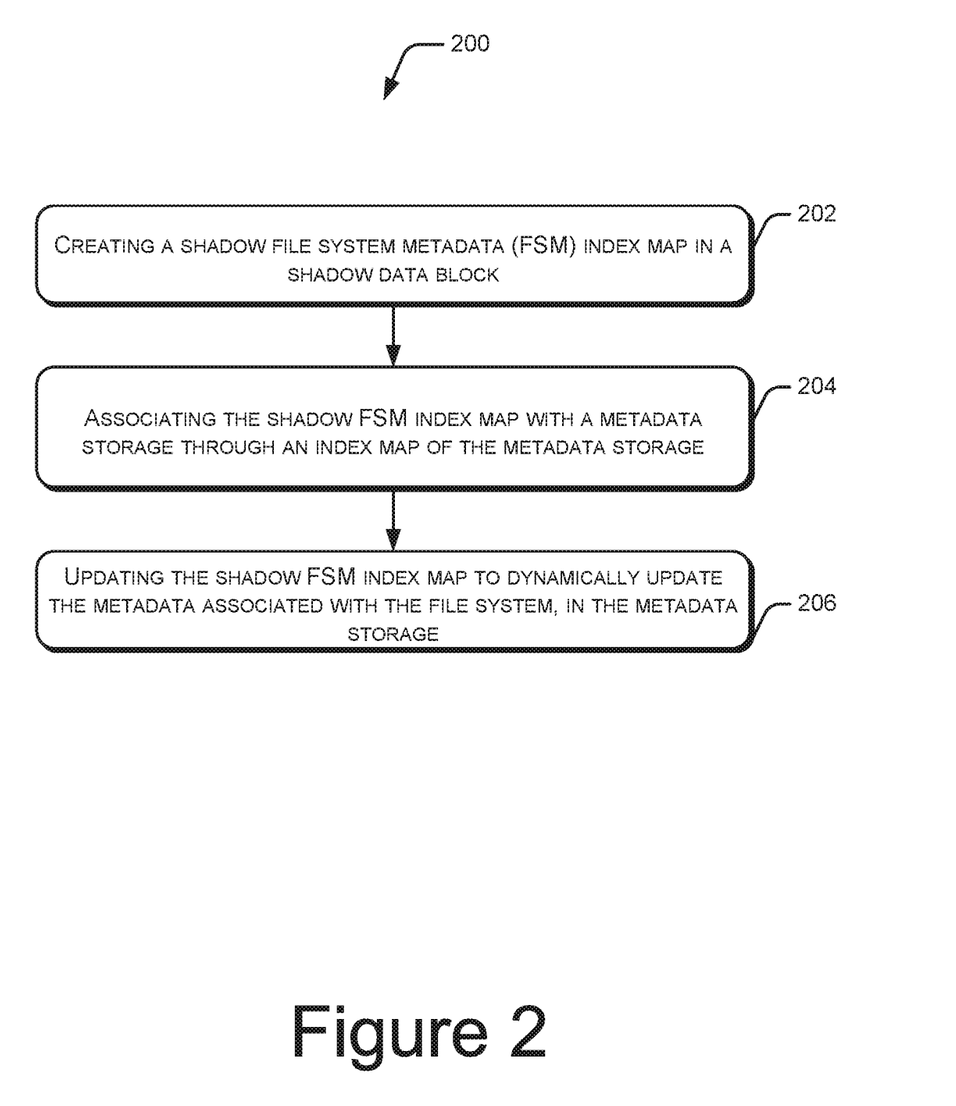
FIG. 2 illustrates a method for dynamically updating metadata, according to an example of the present subject matter.
Figure 3:
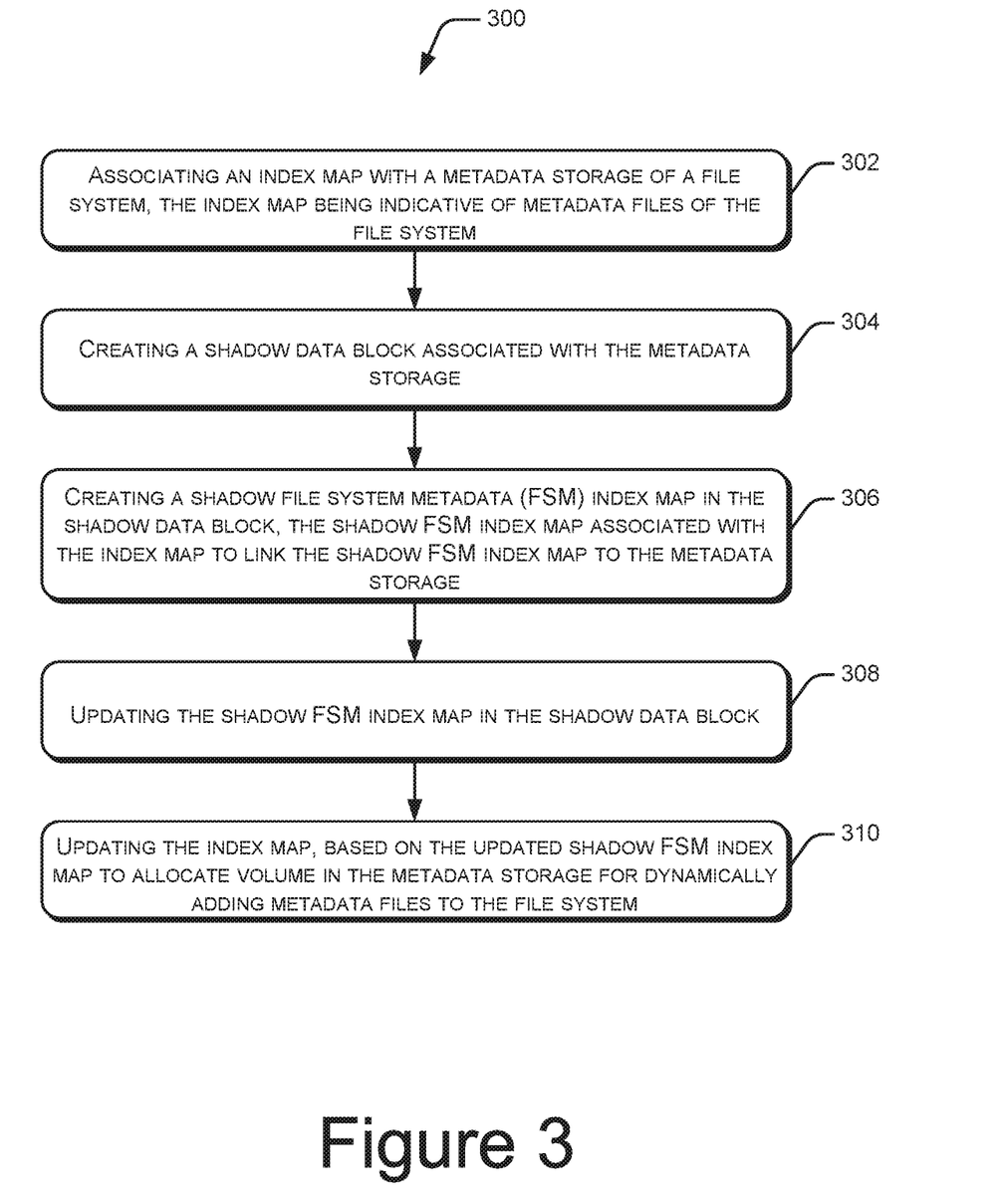
FIG. 3 illustrates a detailed method for dynamically updating the metadata, according to an example of the present subject matter.

Methods 200 and 300 are described in FIG. 2 and FIG. 3, respectively, for dynamically updating metadata associated with a file system, according to an example of the present subject matter. While FIG. 2 illustrates an overview of the method 200 for dynamically updating the metadata associated with the file system, FIG. 3 illustrates a detailed method 300 for dynamically updating the metadata associated with the file system.

The order in which the methods 200 and 300 are described is not intended to be construed as a limitation, and any number of the described method blocks can be combined in any appropriate order to implement the methods 200 and 300 or an alternative method. Additionally, individual blocks may be deleted from the methods 200 and 300 without departing from the spirit and scope of the subject matter described herein.

The methods 200 and 300 can be performed by programmed computing devices, for example, based on instructions retrieved from non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

The methods 200 and 300 may be performed by a computing system, such as the metadata updating system 100. For the sake of brevity of description of FIG. 2 and FIG. 3, the components of the metadata updating system 100 performing the various steps of the methods 200 and 300 are not described in detail with reference to FIG. 2 and FIG. 3. Such details are provided in the description provided with reference to FIG. 1A, FIG. 1B, and FIG. 1C.

Referring to FIG. 2, at block 202, a shadow file system metadata (FSM) index map can be created in a shadow data block 130. The shadow data block 130 can correspond to and can be associated with a metadata storage 128 of the file system. As mentioned previously, the metadata storage 128 can store metadata files associated with the file system. For instance, the shadow data block 130 can be an image of the metadata storage.

At block 204, the shadow FSM index map is associated with the metadata storage 128, for instance, to associate the shadow data block 130 with the metadata storage 128. According to an aspect of the present subject matter, the shadow FSM index map can be coupled to the metadata storage 128 through an index map of the metadata storage 128. For instance, the index map of the metadata storage 128 can be indicative of the metadata files of the metadata storage 128. For example, the index map of the metadata storage 128 can indicate an actual location of the metadata files in the volume of the metadata storage 128.

At block 206, the shadow FSM index map can be updated to dynamically update the metadata storage 128, i.e., for dynamically adding metadata files to the metadata. As the shadow FSM index map is updated, the index map of the metadata storage 128 can be modified. In turn, the modification in the index map can achieve a dynamic allocation of a portion in the volume in the metadata storage 128 for storing the metadata file to be added.

Referring to FIG. 3, at block 302, the index map is associated with the metadata storage 128 of the file system, the index map being indicative of the metadata files of the file system. In an example, the index map can be a cascaded structure of index maps. For instance, the index map can include a primary file system metadata (FSM) index map and an index map of the primary FSM index map, referred to as an intermediate index map. In one example, the primary FSM index map can be an index map of unique identifiers of the metadata files.

At block 304, the shadow data block 130 corresponding to and associated with the metadata storage 128 of the file system is created.

At block 306, the shadow FSM index map can be created in the shadow data block 130, the shadow FSM index map being associated with the index map to form an association with the metadata storage 128. In the above example, the shadow FSM index map can be associated to the metadata storage 128 through the primary FSM index map and the intermediate index map of the primary FSM index map. Accordingly, the shadow FSM index map can form a sub-index, i.e., an index of the index of the primary FSM index map.

At block 308, the shadow FSM index map can be updated. In an example, the shadow FSM index map can be updated by adding an index to the shadow FSM index map. For instance, the index added to the shadow FSM index map can be an index for a unique identifier of the metadata file to be added or an index for the metadata file or for both.

Figure 4:
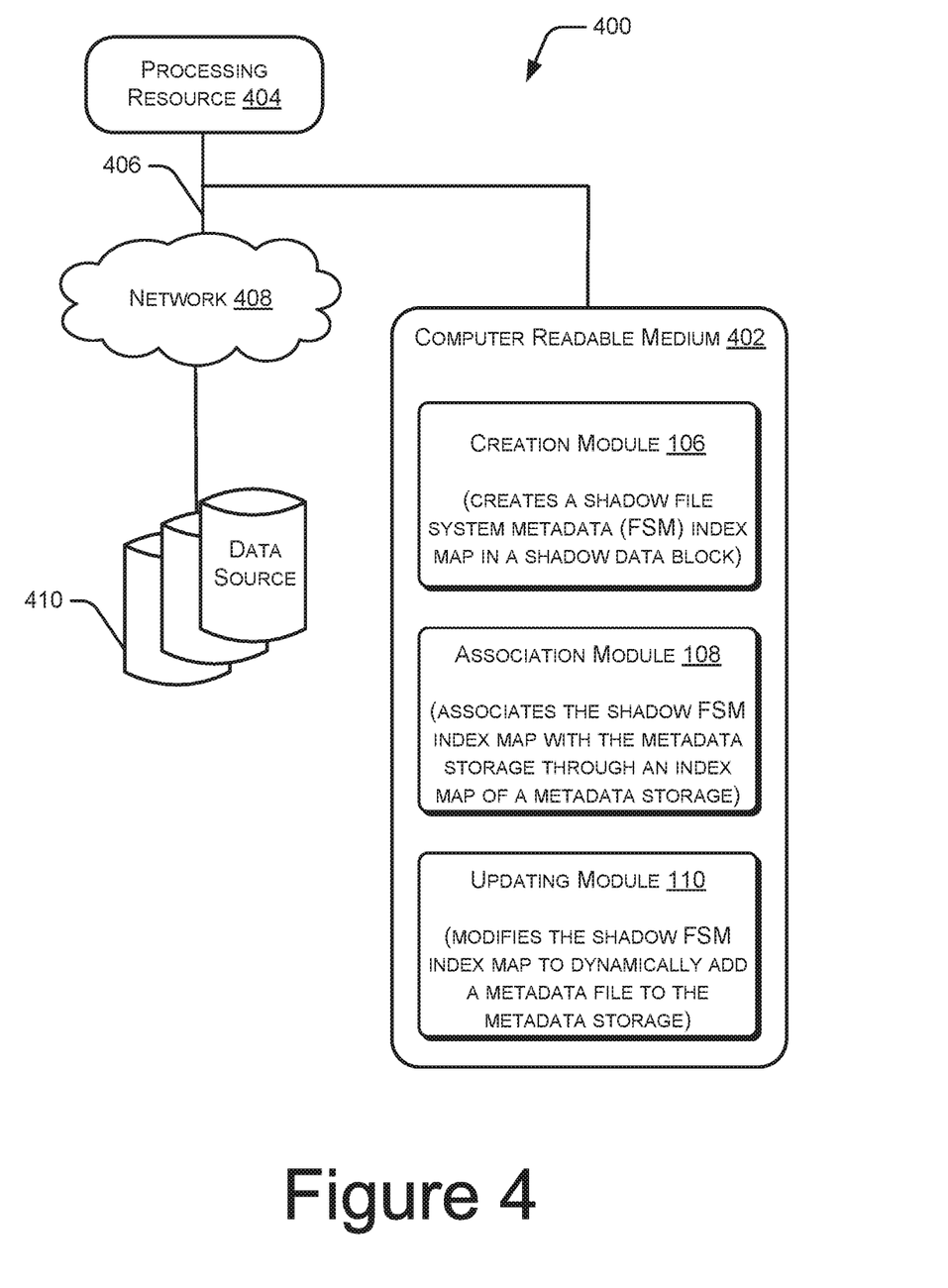
FIG. 4 illustrates a computer readable medium storing instructions to dynamically update metadata, according to an example of the present subject matter.

At block 310, based on the updated shadow FSM index map, the index map is updated to allocate a portion of the volume of the metadata storage 128 for dynamically adding the metadata files to the file system, to update the metadata storage 128 in a dynamic manner. For instance, in the above example, the modification of the shadow FSM index map can, in turn, be reflected in the primary FSM index map. In the present case where the shadow FSM index map is linked to the primary FSM index map through the intermediate index map, the modification in the shadow FSM index map is reflected in the intermediate map, FIG. 4 illustrates an example network environment 400 implementing a non-transitory computer readable medium 402 for dynamically updating metadata associated with a file system, according to an example of the present subject matter. The network environment 400 may be a public networking environment or a private networking environment. In one implementation, the network environment 400 includes a processing resource 404 communicatively coupled to the non-transitory computer readable medium 402 through a communication link 406.

For example, the processing resource 404 can be a processor of a computing system, such as the metadata updating system 100. The non-transitory computer readable medium 402 can be, for example, an internal memory device or an external memory device. In one implementation, the communication link 406 may be a direct communication link, such as one formed through a memory read/write interface. In another implementation, the communication link 406 may be an indirect communication link, such as one formed through a network interface. In such a case, the processing resource 404 can access the non-transitory computer readable medium 402 through a network 408. The network 408 may be a single network or a combination of multiple networks and may use a variety of communication protocols.

The processing resource 404 and the non-transitory computer readable medium 402 may also be communicatively coupled to data sources 410 over the network 408. The data sources 410 can include, for example, databases and computing devices. The data sources 410 may be used by the database administrators and other users to communicate with the processing resource 404.

In one implementation, the non-transitory computer readable medium 402 includes a set of computer readable instructions, such as the creation module 106, the association module 108 and the updating module 110. The set of computer readable instructions, referred to as instructions hereinafter, can be accessed by the processing resource 404 through the communication link 406 and subsequently executed to perform acts for network service insertion.

For discussion purposes, the execution of the instructions by the processing resource 404 has been described with reference to various components introduced earlier with reference to description of FIG. 1A, FIG. 1B, and FIG. 10.

On execution by the processing resource 404 the creation module 106 can create the shadow FSM index map in the shadow data block 130. The shadow data block 130 can correspond to and can be associated with a metadata storage 128 of the file system. As mentioned previously, the metadata storage 128 can store metadata files associated with the file system. For instance, the shadow data block 130 can be an image of the metadata storage. Further, the association module 108 associates the shadow FSM index map with the metadata storage 128, for instance, to associate the shadow data block 130 with the metadata storage 128. As mentioned previously, the shadow FSM index map can be coupled to the metadata storage 128 through an index map of the metadata storage 128. For instance, the index map of the metadata storage 128 can be indicative of the metadata files of the metadata storage 128. For example, the index map of the metadata storage 128 can indicate an actual location of the metadata files in the volume of the metadata storage 128.

In addition, the updating module 110 can modify the shadow FSM index map to dynamically add metadata files to the metadata storage 128. As the shadow FSM index map is updated, the index map of the metadata storage 128 can be modified. In turn, the modification in the index map can achieve a dynamic allocation of a portion in the volume in the metadata storage 128 for storing the metadata file to be added.

Although implementations for dynamically updating the metadata have been described in language specific to structural features and/or methods, it is to be understood that the appended claims are not necessarily limited to the specific features or methods described. Rather, the specific features and methods are disclosed as example implementations for dynamically updating the metadata.

We claim:

1. A method to update metadata associated with a file system, the method comprising:
creating a shadow file system metadata (FSM) index map in a shadow data block stored in a container provided in a reserved bitfile metadata table, the shadow data block being associated with a metadata storage of the file system and the metadata storage storing metadata files associated with the file system;
associating the shadow FSM index map with a primary FSM index map stored in an mcell of the metadata storage through an index map of the metadata storage, the index map being indicative of the metadata files in the metadata storage; and
updating the shadow FSM index map to dynamically update the metadata associated with the file system, in the metadata storage.

2. The method as claimed in claim 1, wherein the associating comprises coupling the shadow FSM index map to a primary file system metadata (FSM) index map via one or more intermediate FSM index maps to form an index of the primary FSM index map, the primary FSM index map being an index map of unique identifiers associated with the metadata files of the file system, the metadata files being stored in the metadata storage.

3. The method as claimed in claim 1, wherein the updating comprises adding an index in the shadow FSM index map for adding a metadata file in the metadata storage, the index being an index for a unique identifier of the metadata file.

4. The method as claimed in claim 1, wherein the metadata files comprise reserved files associated with the file system.

5. The method as claimed in claim 1, wherein the file system is a multi-volume file system, and wherein the metadata associated with each volume of the multi-volume file system is updated.

6. A metadata updating system to update metadata associated with a file system, the metadata updating system comprising:
a processor;
a creation module coupled to the processor to,
create a shadow data block corresponding to a metadata storage of the file system stored in a container provided in a reserved bitfile metadata table, the metadata storage storing metadata files associated with the file system; and
create a shadow file system metadata (FSM) index map in the shadow block data;
an association module to associate the shadow FSM index map with a primary FSM index map stored in an mcell of the metadata storage through an index map of the metadata storage, the index map being indicative of a location of the metadata files in the metadata storage; and
an updating module to update the shadow data block to add a metadata file in the metadata storage to update the metadata.

7. The metadata updating system as claimed in claim 6, wherein the association module is to associate the shadow FSM index map to the metadata storage through a primary file system metadata (FSM) index map via one or more intermediate FSM index maps, the primary FSM index map being an index map of unique identifiers associated with the metadata files of the file system, the metadata files being stored in the metadata storage.

8. The metadata updating system as claimed in claim 6, wherein the updating module is to update the shadow FSM index map to dynamically create the metadata file.

9. The metadata updating system as claimed in claim 6, wherein the metadata files comprise reserved files associated with the file system.

10. The metadata updating system as claimed in claim 9, wherein the updating module is to populate a reserved tag in the shadow data block, the reserved tag being associated with a reserved file from among the reserved files.

11. The metadata updating system as claimed in claim 6, wherein the updating module adds an index in the shadow FSM index map to add a metadata file in the metadata storage, the index being an index for a unique identifier of the metadata file.

12. A non-transitory computer-readable medium comprising instructions executable by a processing resource to:
create a shadow file system metadata (FSM) index map in a shadow data block stored in a container provided in a reserved bitfile metadata table, the shadow data block associated with a metadata storage of the file system and the metadata storage storing metadata files associated with the file system;
associate the shadow FSM index map with a primary FSM index map stored in an mcell of the metadata storage through an index map of the metadata storage, the index map being indicative of the metadata files in the metadata storage; and
modify the shadow FSM index map to dynamically add a metadata file to the file system to dynamically update the metadata storage for updating the metadata.

13. The non-transitory computer-readable medium as claimed in claim 12, wherein the non-transitory computer-readable medium further comprises instructions executable by the processing resource to associate the shadow FSM index map with a primary file system metadata (FSM) index map through an index of the primary FSM index map via one or more intermediate FSM index maps to form an index of the primary FSM index map, the primary FSM index map being an index map of unique identifiers associated with the metadata files of the file system, the metadata files being stored in the metadata storage.

14. The non-transitory computer-readable medium as claimed in claim 12, wherein the non-transitory computer-readable medium further comprises instructions executable by the processing resource to update the shadow data block to dynamically create the metadata file.

15. The non-transitory computer-readable medium as claimed in claim 14, wherein the non-transitory computer-readable medium further comprises instructions executable by the processing resource to populate a reserved tag in the shadow data block, the reserved tag being associated with a reserved file of the file system, the reserved file being the metadata file to be created in the file system.

\* \* \* \* \*